United States Patent [19]
Fredkin

[11] Patent Number: 4,756,830
[45] Date of Patent: Jul. 12, 1988

[54] PUMPING APPARATUS

[76] Inventor: Edward Fredkin, 166 Hyslop Rd., Brookline, Mass. 02146

[21] Appl. No.: 50,780

[22] Filed: May 18, 1987

[51] Int. Cl.⁴ .............................................. B01D 13/00
[52] U.S. Cl. .............................. 210/321.66; 210/416.1
[58] Field of Search .......................... 210/416.1, 321.66

[56] References Cited

U.S. PATENT DOCUMENTS 3,825,122  7/1974  Taylor ........................ 210/321.66 X

*Primary Examiner*—Frank Spear
*Attorney, Agent, or Firm*—Henry D. Pahl, Jr.

[57] ABSTRACT

The pumping apparatus disclosed herein recovers pumping energy required in feeding solution to a reverse osmosis unit. The reverse osmosis unit generates a purified product but also a concentrate stream which is discharged at a pressure only slightly lower than the feed pressure. The discharge flow is utilized to displace hydraulic fluid in a work exchange vessel and this displaced fluid is then boosted in pressure and supplemented by an additional flow of hydraulic fluid, the combined hydraulic fluid flow being then utilized to pressurize, through another work exchange vessel, the solution feed flow to the reverse osmosis unit.

2 Claims, 1 Drawing Sheet

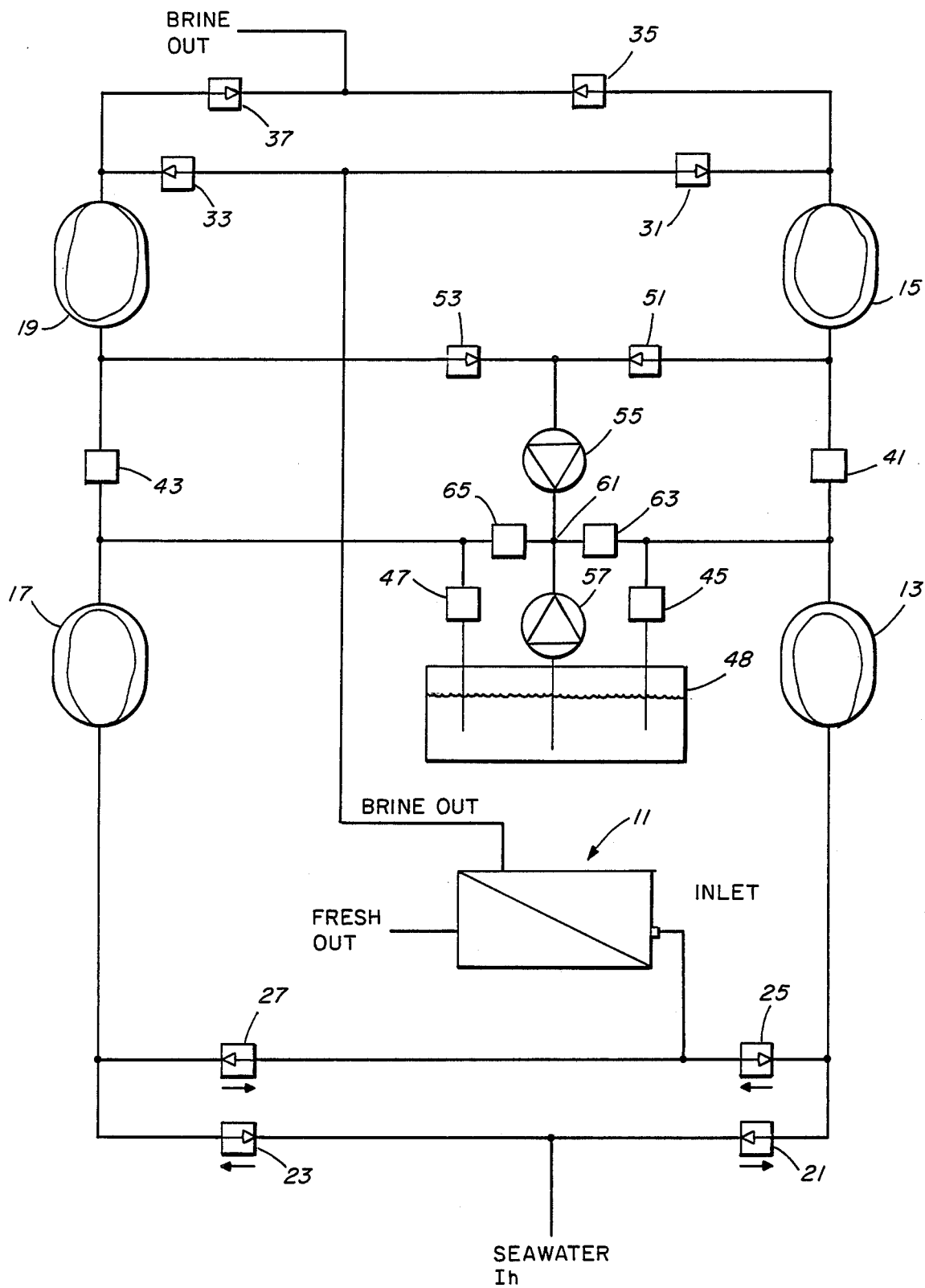

PUMPING APPARATUS

BACKGROUND OF THE INVENTION

The present invention relates to a pumping appartus for feeding solution to a reverse osmosis unit and more particularly to such pumping apparatus which provides for the recovery of pumping energy.

It has previously been proposed to recover some proportion of the pumping energy required in feeding a reverse osmosis unit, one such proposal being described in U.S. Pat. No. 4,354,939 issued Oct. 19, 1982 to Curt M. Pohl. A similar proposal is described in the article entitled "Energy Recovery for Small Reverse Osmosis Systems" by Jeffery C. Ide and Melvin E. Matson. A small, manually operated, reverse osmosis apparatus incorporating some energy recovery is described in U.S. Pat. No. 4,187,173 to Bowie G. Keefer.

While these prior art proposals show the desirablity of recovering pumping energy which is otherwise lost in the discharge flow of concentrate, the systems have not found general acceptance due to the difficulty of implementation. Typically these systems have involved multiple pumps operating on sea water and/or brine at high pressure. As is understood by those skilled in the art, pumps suitable for such application are not readily available and the application conditions essentially define a hostile environment for such machinery.

Among the several objects of the present invention may be noted the provision of novel pumping apparatus for a reverse osmosis unit which will efficiently recover pumping energy from the concentrate discharge flow; the provision of such a pumping system which does not require the pumping of solution or concentrate at high pressures; the provision of such apparatus which can be constucted using relatively conventional components; the provision of such a system which requires a minimal number of pumps; the provision of such a system which is highly efficient; the provision of such a system which is highly reliable and the provision of such a system which is of relatively simple and inexpensive construction. Other objects and features will be in part apparent and in part pointed out hereinafter.

SUMMARY OF THE INVENTION

The pumping apparatus of the present invention is adapted to feed a reverse osmosis unit and incorporates a plurality of work exchange subsystems each of which includes first and second work exchange vessels. The first vessel receives a solution on one side and a hydraulic fluid on the other while the second vessel receives concentrate on one side and hydraulic fluid on the other. During a low pressure phase of operation, hydraulic fluid displaced by the introduction of solution into one side of a first vessel passes into the other side of the respective second vessel thereby displacing concentrate which is discharged. Booster pump means are provided for transferring hydraulic fluid during a high pressure phase of operation to the other side of a selected one of the first vessels from the other side of the respective second vessel. Further pump means are provided for introducing additional hydraulic fluid into the other side of that first vessel. The solution side of each of the first set work exchange vessels can be selectively connected to the solution inlet of the reverse osmosis unit while the concentrate outlet of that unit is connected to the concentrate side of the respective second vessels so that hydraulic fluid displaced by the concentrate aids the pumps in driving solution from the one side of the respective first vessel into the inlet of the reverse osmosis unit.

BRIEF DESCRIPTION OF THE DRAWING

The single drawing is the schematic diagram of a reverse osmosis sea water purifying system incorporating pumping apparatus acccording to the present invention.

DESCRIPTION OF THE PREFERRED EMBODIMENT

The reverse osmosis system described herein by way of example is intended for the desalinization of sea water. Accordingly, throughout most of the specification, the incoming solution which is to be purified is referred to as sea water; the concentrate by-product is referred to as brine; and the purified product is referred to as fresh water.

As is understood by those skilled in the art, it is typically necessary to pre-treat sea water, e.g. for correcting ph, prior to pumping it at high pressure to a reverse osmosis unit. As such pre-treatment facilities are known in the art, they are not described herein but rather the sea water input to the present apparatus is assumed to be pre-treated sea water at some nominal pressure, eg. 30 psi.

In the single drawing the reverse osmosis unit is indicated generally be reference character 11. As indicated previously the pumping system of the present invention utilizes a plurality of work exchange subsystems each of which includes first and second work exchange vessels. The embodiment illustrated utilizes two such work exchange subsystems, one shown on the right side of the drawing and the other on the left. The first and second work exchange vessels on the right hand side are designated generally by reference characters 13 and 15 while the corresponding components in the left hand subsystem are designated by reference characters 17 and 19.

Particularly for small systems, a convenient form of work exchange vessel is to utilize a structure which is essentially the same as a conventional pressure accumulator ie., a tough rubber bladder inside a rounded tank. However, instead of having dry nitrogen inside the bladder, as would be the usual arrangement in the case of a pressure accumulator, an inlet port is provided for introducing brine or sea water to the interior of the bladder. As illustrated, hydraulic fluid is on the outside of the bladder in each work exchange vessel.

Sea water can be introduced into one side of each of the lower work exchange vessels through respective valves 21 and 23. In the drawing these valves are shown as check valves though in certain applications it may be advantageous to utilize controlled valves, e.g. solenoid or hydraulically operated valves. It is an advantage of the overall system described herein that the valves which control the flow of sea water and brine in the present system do not need to open or close in the presence of a significant pressure differential. Thus certain design requirements for the valves are very relaxed. The same side of each of the lower work exchange vessels can also provide sea water to the inlet of the reverse osmosis unit 11 through respective valves designated by reference characters 25 and 27.

Brine leaving the reverse osmosis unit 11 can be selectively admitted to one side of either of the upper work exchange vessels 15 and 19 through respective controlled valves 31 and 33. Brine ejected from these work exchange vessels can be discharged out through a common outlet through respective controlled valves designated by reference characters 35 and 37. As illustrated in the drawing, the upper or hydraulic fluid side of each of the lower accumulators is connected to the lower or hydraulic fluid side of the upper work exchange vessel through a respective solenoid valve, these valves being designated by reference characters 41 and 43. Accordingly, during the phase of operation when the bladder in a lower work exchange vessel is being filled with sea water, the displaced hydraulic fluid can flow into the upper work exchange vessel and displace brine into the discharge stream. As will be understood, however, the amount of brine discharged is less than the corresponding amount of sea water being brought in and thus there will be a mismatch with respect to the corresponding amounts of hydraulic fluid. Accordingly, the upper side of each of the lower work exchange vessels is also coupled, through a respective solenoid valve 45 or 47, back to a hydraulic fluid reservoir 48.

As was also indicated previously, hydraulic fluid displaced by brine exiting the reverse osmosis unit at high pressure is used to aid pumping of the sea water into the reverse osmosis unit. To this end, the lower side of each of the upper work exchange vessels is connected, through a respective valve 51 or 53, to the inlet port of a booster pump 55 whose function is to overcome the frictional pressure losses caused by the flow of sea water, brine and hydraulic fluids through the pipes, valves and, to make up the pressure differential which occurs between the sea water inlet and the brine outlet of the reverse osmosis unit 11.

To make up the volume differential between the sea water input and the brine effluent from the reverse osmosis unit, a second pump is provided, designated by reference character 57. This second pump draws hydraulic fluid from the reservoir 48 and provides a high pressure boost, though usually at a smaller flow volume. The flow from the two pumps merge at a junction point, designated generally by a reference character 61 and the combined flow can be applied to the upper side of either of the lower work exchange vessels 13 or 17 through respective solenoid valve 63 and 65.

OPERATION

As indicated previously, the system illustrated operates in a cyclic manner in which the right and left work exchange subsystems alternate in being in a high pressure phase, there being a low pressure filling phase for each side in between high pressure operations. Considering first the low pressure or filling phase of the right hand work exchange subsystem, it can be seen that sea water can flow, through the valve 21 into the bladder of the work exchange vessel 13. At the same time, the valve 41 is operated so that hydraulic fluid displaced by the sea water flows into the work exchange vessel 15 and displaces brine which exits, through the valve 35, into the brine discharge outlet.

Once the brine is essentially discharged, the valve 41 is closed and the valve 45 is opened so that the excess hydraulic fluid, i.e. corresponding to the larger volume of sea water, is discharged back into the reservoir 48. In that the filling operation takes place through generally unrestricted flow passages, the filling operation can be completed well before the left side completes its high pressure phase of operation in which sea water is being fed through the reverse osmosis unit 11.

As the left side work exchange subsystem is completing its high pressure phase, the valve 63 is opened to pressurize the right hand subsystem. The valve 65 is preferably closed only after the valve 63 is open so that the reverse osmosis unit 11 is at all times maintained under high pressure. With the valve 63 open and valves 41 and 45 closed, the pumps 55 and 57 will drive the merged hydraulic fluid flow into the upper part of the work exchange vessel 13 displacing sea water at high pressure out of the lower side of the work exchange vessel and into the reverse osmosis unit. As will be understood, most of the volume of this displacement will derive from hydraulic fluid displaced by brine which is, at the same time, flowing into the upper part of the work exchange vessel 15 though valve 31. In pumping this volume of fluid, the pump 55 operates across a relatively low pressure differential, i.e. equal to the pressure drop between the sea water inlet and brine outlet of the reverse osmosis unit.

The pump 57 which works across the whole operational pressure of the reverse osmosis process need pump only a relatively small volume of hydraulic fluid, i.e. a volume essentially equal to the fresh water product generated by the reverse osmosis unit. As is understood by those skilled in the art, a typical figure for fresh water production is 20 percent of the total sea water volume applied to the unit. Thus 80 percent of the pumping volume required to displace the sea water into the osmosis unit will come from the brine discharge. As indicated previously, this volume, through the intermediate hydraulic fluid, need be pumped across only a relatively small differential, e.g. 60 psi, as compared with the total pressure required to feed the reverse osmosis, i.e. a pressure which is typically in the order of 800 psi. Accordingly, it can be seen that there is a substantial energy recovery ie., in the order of 75 percent. Further, this energy recovery is obtained without having to directly pump either sea water or brine. Rather, the pumps in the system illustrated all operate on hydraulic fluid and therefore the pumps can be of essentially conventional design and construction.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Pumping apparatus for feeding a reverse osmosis unit, said apparatus comprising:
   a plurality of work exchange subsystems each of which includes first and second work exchange vessels, the first said vessels receiving solution on one side and hydraulic fluid on the other, the second said vessels receiving concentrate on one side and hydraulic fluid on the other;
   interconnection means, including a selectively operable valve, for permitting hydraulic fluid displaced by the introduction of solution into the one side of the respective first vessel to flow into the other side of the respective second vessel thereby displacing concentrate;
   booster pump means for transferring hydraulic fluid to the other side of a selected one of said first vessels from the other side of the respective second vessel;

pump means for introducing additional hydraulic fluid into the other side of the selected first vessel;

means for selectively connecting the one side of each of the first said work exchange vessels to the solution inlet of a reverse osmosis unit;

means for selectively connecting the concentrate outlet of a reverse osmosis unit to said on side of a selected one of said second vessels so that hydraulic fluid thereby displaced aids said pumps in driving solution from the one side of the respective first vessel into the reverse osmosis unit.

2. Pumping apparatus for feeding solution at high pressure to a reverse osmosis unit, said apparatus comprising:

a pair of work exchange subsystems each of which operate alternatingly in high pressure phases, each of said subsystems including first and second work exchange vessels, the first said vessels receiving solution on one side and hydraulic fluid on the other, the second said vessels receiving concentrate on one side and hydraulic fluid on the other;

interconnection means, including a selectively operable valve, for permitting hydraulic fluid displaced by the introduction of solution into the one side of the respective first vessel to flow into the other side of the respective second vessel thereby displacing concentrate during a low pressure phase of operation of the respective work exchange subsystem;

booster pump means for transferring hydraulic fluid to the other side of a selected one of said first vessels from the other side of the respective second vessel during a high pressure phase of operation of the respective work exchange subsystem, the amount of hydraulic fluid transferred being substantially equal to the concentrate produced by the reverse osmosis unit;

pump means for introducing additional hydraulic fluid into the other side of a selected first vessel also during the respective high pressure phase of operation, the amount being substantially equal to the product produced by the reverse osmosis unit;

means for selectively connecting said one side of each of the first said work exchange vessels to the solution inlet of a reverse osmosis unit;

means for selectively connecting the concentrate outlet of a reverse osmosis unit to said one side of a selected one of said second vessels so that hydraulic fluid thereby displaced aids said pumps in driving solution from the one side of the respective first vessel into the reverse osmosis unit.

* * * * *